United States Patent
Miettinen et al.

(10) Patent No.: US 10,356,189 B2
(45) Date of Patent: Jul. 16, 2019

(54) SYSTEM AND METHOD FOR CREATING AD-HOC EVENTS FROM SENSED SPORT-SPECIFIC DATA

(71) Applicant: Suunto Oy, Vantaa (FI)

(72) Inventors: Michael Miettinen, Tuusula (FI); Teemu Maikkola, Helsinki (FI); Timo Eriksson, Helsinki (FI); Heikki Nieminen, Espoo (FI); Erik Lindman, Espoo (FI); Mikko Ahlström, Helsinki (FI)

(73) Assignee: Suunto Oy, Vantaa (FI)

( * ) Notice: Subject to any disclaimer, the term of this patent is extended or adjusted under 35 U.S.C. 154(b) by 496 days.

(21) Appl. No.: 14/945,914

(22) Filed: Nov. 19, 2015

(65) Prior Publication Data

US 2016/0150039 A1    May 26, 2016

(30) Foreign Application Priority Data

Nov. 20, 2014  (FI) .................................... 20146019
Nov. 20, 2014  (GB) .................................... 1420610.6
Jan. 27, 2015  (FI) .................................... 20155059
Jan. 29, 2015  (GB) .................................... 1501493.9

(51) Int. Cl.
 *H04L 29/08*  (2006.01)

(52) U.S. Cl.
 CPC .............. *H04L 67/22* (2013.01); *H04L 67/12* (2013.01); *H04L 67/306* (2013.01)

(58) Field of Classification Search
 CPC ....... H04L 67/22; H04L 67/306; H04L 67/12; H04L 67/18
 See application file for complete search history.

(56) References Cited

U.S. PATENT DOCUMENTS

| | | |
|---|---|---|
| 7,129,835 B2 | 10/2006 | Nikkola |
| 7,152,470 B2 | 12/2006 | Impio et al. |
| 7,271,774 B2 | 9/2007 | Puuri |
| 7,324,002 B2 | 1/2008 | Iso-Heiko et al. |
| 7,349,805 B2 | 3/2008 | Kaltto et al. |
| 7,379,712 B2 | 5/2008 | Saamimo |
| 7,383,081 B2 | 6/2008 | Butt et al. |
| 7,515,938 B2 | 4/2009 | Ruotsalainen et al. |
| 7,600,426 B2 | 10/2009 | Savolainnen et al. |
| 7,764,990 B2 | 7/2010 | Martikka et al. |
| 7,797,039 B2 | 9/2010 | Koivumaa et al. |
| 7,803,117 B2 | 9/2010 | Martikka et al. |

(Continued)

FOREIGN PATENT DOCUMENTS

| | | |
|---|---|---|
| CN | 202649695 | 1/2013 |
| EP | 2189191 | 5/2010 |
| WO | 2011028383 A1 | 3/2011 |

*Primary Examiner* — Oanh Duong
(74) *Attorney, Agent, or Firm* — Terence P. O'Brien; Papula-Nevinpat (57) ABSTRACT

A method, a sports watch, a computer program, a computing device and a system for creating an event accessible over a communications network, characterized by the method comprising receiving a first sport-specific data from a first sports watch; receiving a second sport-specific data from a second sports watch; comparing the first sport-specific data and the second sport-specific data; detecting a common context with the first sport-specific data and the sport-specific second data; and creating an event based on the common context.

24 Claims, 8 Drawing Sheets

(56) References Cited

U.S. PATENT DOCUMENTS

| | | |
|---|---|---|
| 7,936,226 B2 | 5/2011 | Akkila |
| 8,021,306 B2 | 9/2011 | Martikka et al. |
| 8,024,023 B2 | 9/2011 | Tolvanen |
| 8,275,311 B2 | 9/2012 | Lindman |
| 8,292,820 B2 | 10/2012 | Punkka et al. |
| 8,371,745 B2 | 2/2013 | Manni |
| 8,386,009 B2 | 2/2013 | Lindberg et al. |
| 8,750,959 B2 | 6/2014 | Lindberg et al. |
| 9,339,198 B2 | 5/2016 | Lindman |
| 9,468,835 B2 | 10/2016 | Martikka et al. |
| 9,692,839 B2 * | 6/2017 | Davis .................. H04L 67/22 |
| 2003/0227479 A1 * | 12/2003 | Mizrahi .................. A63F 13/10 715/753 |
| 2007/0285868 A1 | 12/2007 | Lindberg et al. |
| 2008/0109158 A1 | 5/2008 | Huhtala et al. |
| 2008/0119329 A1 | 5/2008 | Punkka et al. |
| 2008/0289415 A1 | 11/2008 | Savolainen et al. |
| 2008/0319330 A1 | 12/2008 | Juntunen et al. |
| 2009/0312657 A1 | 12/2009 | Martikka et al. |
| 2010/0130123 A1 | 5/2010 | Lindman |
| 2010/0187074 A1 | 7/2010 | Manni |
| 2011/0128824 A1 | 6/2011 | Downey et al. |
| 2011/0161455 A1 | 6/2011 | Johnson et al. |
| 2011/0230274 A1 | 9/2011 | Lafortune et al. |
| 2011/0263993 A1 | 10/2011 | Martikka et al. |
| 2011/0276396 A1 * | 11/2011 | Rathod .................. G06Q 10/00 705/14.49 |
| 2012/0215116 A1 | 8/2012 | Martikka et al. |
| 2012/0254212 A1 | 10/2012 | Shaw et al. |
| 2013/0109364 A1 * | 5/2013 | Mercuri .................. H04M 3/42 455/414.2 |
| 2013/0204567 A1 | 8/2013 | Nieminen et al. |
| 2013/0311123 A1 | 11/2013 | Nieminen et al. |
| 2013/0337828 A1 | 12/2013 | Fink |
| 2014/0012918 A1 * | 1/2014 | Chin .................. G06Q 50/01 709/204 |
| 2014/0100788 A1 | 4/2014 | Heikkinen et al. |
| 2014/0172355 A1 | 6/2014 | Kawamoto |
| 2014/0185954 A1 * | 7/2014 | Hsiao .................. G06Q 10/10 382/264 |
| 2014/0277628 A1 | 9/2014 | Nieminen et al. |
| 2014/0282131 A1 | 9/2014 | Castro et al. |
| 2014/0375428 A1 * | 12/2014 | Park .................. G06K 7/10237 340/10.1 |
| 2015/0071039 A1 | 3/2015 | Rahkonen et al. |
| 2015/0071280 A1 | 3/2015 | Ahola et al. |
| 2015/0105125 A1 * | 4/2015 | Min .................. G04G 21/04 455/566 |
| 2015/0180965 A1 * | 6/2015 | Wouhaybi .................. H04L 12/1822 709/205 |
| 2016/0029148 A1 * | 1/2016 | Jackson .................. H04W 76/14 455/41.2 |
| 2016/0136525 A1 * | 5/2016 | Soni .................. G06Q 10/06311 463/29 |
| 2017/0160898 A1 * | 6/2017 | Lee .................. G06F 3/041 |

\* cited by examiner

SYSTEM AND METHOD FOR CREATING AD-HOC EVENTS FROM SENSED SPORT-SPECIFIC DATA

CROSS-REFERENCE TO RELATED PATENT APPLICATIONS

The present application claims priority under 35 U.S.C. Section 119 from Finnish Patent Application Serial Nos. 20146019 and 20155059 filed on Nov. 20, 2014 and Jan. 27, 2015, respectively, and English Patent Application Serial Nos. 1420610.6 and 1501493.9 filed on Nov. 20, 2014 and Jan. 29, 2015, respectively.

FIELD OF THE INVENTION

The invention relates to sharing information. In particular, the present invention relates to a method, a sports watch, a computer program, a computing device and a system for detecting and/or creating an event.

BACKGROUND

A sports watch is typically a small microcontroller-operated device, for example a wrist-top computer which can be used for monitoring and/or tracking sports exercises. The recorded sports exercise data may be transmitted to the Internet and shared with other users or athletes. Results are usually compared with other users. Recorded tracks may be saved and assigned as events by users, wherein the user must manually indicate a track, route, path or any kind of comparable criteria to the computer. In this context the comparable sport information is an event.

Usually a sports watch is a relatively small device with a limited screen size. The sports watch must be robust enough to withstand all various elements encountered during the sports exercise. The user interface is usually operated with a few buttons that are operable during a sport exercise such as running—thus limiting the number of buttons and increasing the size of the buttons. This creates a contradiction between ease of use and complicated functions that are sometimes modifiable by the user. Therefore, many events will not be created or assigned and several users lack the experience of sharing a comparable sporting event.

SUMMARY OF THE INVENTION

One aspect presents a method executed on a computing device for creating an event accessible over a communications network. The method comprises receiving a first sport-specific data from a first sports watch, receiving a second sport-specific data from a second sports watch, comparing the first sport-specific data and the second sport-specific data; detecting a common context with the first sport-specific data and the sport-specific second data; and creating an event based on the common context.

In an embodiment the first sport-specific data is formed by the first sports watch and the second sport-specific data is formed by the second sports watch. The sport-specific data is for example related to a sports exercise and comprises parameters measured by the sports watch. As an example, when a server detects for example a similar context in the sport-specific exercise data, such as a route that at least two users wearing a sports watch have been running, it assigns the similar route as a new event. Similarly, if runners are running at the same time in nearby locations, the context is common between the users of sport watches. Examples of context information are: locations, nearby locations, routes, tracks or a similar terrain; sport types assigned by the sports watch such as running, walking, skiing, cycling, sailing or any other user modifiable sport type; users or user groups, user profiles or user group profiles that are preconfigured, user profiles assigned as friends to the server, groups assigned by categories such as mountain bikers, road cyclists, sailors of the same boat type; or any similar common information.

In one embodiment the sports watch comprises a positioning sensor providing positioning information. The positioning information is one example of the movement information. The common context comprises at least the location and the sport mode.

In an embodiment the method comprises allowing a user profile assigned as a user of a sports watch to join the event. In an embodiment the first sport-specific data and the second sport-specific data comprise positioning information and the common context comprises at least the location of the event and the sport that the event relates to. In an embodiment the computing device sends a notification of an event invitation to the first sports watch and to the second sports watch.

In an embodiment the computing device provides user profiles assigned to sports watches, comprising a first user profile being assigned to the first sports watch, a second user profile being assigned to the second sports watch and a third user profile being assigned to a third sports watch. The computing device notifies the third user profile about the created event, wherein the third user profile is assigned to follow the first user profile or the second user profile. In an embodiment the computing device is a server, and the server provides a web page accessible via the Internet.

In an embodiment the sports watch comprises at least one sensor providing movement information and a wireless communication interface for communicating with a server. The first sports watch collects sport-specific data and sends the first data to the server. The second sports watch collects sport-specific data and sends the second data to the server. The server compares the first data and at least the second data; detects a common context with the first data and at least the second data; and creates an event based on the common context.

In an embodiment the server sends a notification of an event invitation to the first sports watch and to at least the second sports watch. The event may be a tentative event until the user has accepted the event to be generated. In one embodiment the sports watch receives a notification of an event invitation and displays an interactive user-interface object with which a user interacts in order to accept the event creation.

In one embodiment the server provides user profiles assigned to sports watches, comprising a first user profile being assigned to the first sports watch, a second user profile being assigned to the second sports watch and a third user profile being assigned to the third sports watch. The server notifies the third user profile about the created event, wherein the third user profile is assigned to follow the first user profile or the second user profile. The server may for example notify users assigned to same user group.

In one embodiment the first sports watch receives data from at least the second sports watch participating in the created event. For example, the user may be notified of another user that is running a similar or the same route; or a sailor may be notified of another sailor sailing on a similar boat type nearby or in similar conditions.

In one embodiment the first sports watch alerts the user, if the received data from at least the second sports watch participating in the created event is outside predefined criteria, for example if one member of the event is being left behind the group, such as cyclists or runners; hikers in the woods are advancing too far apart from each other; or the heart rate of one member is too high, enabling the other participants to slow their pace according to the weakest member.

A second aspect discloses a system comprising at least two sports watches. The at least two sports watches comprise at least one sensor for providing movement information. Examples of such sensors are a position sensor providing positioning information or a motion sensor, an inertial sensor or an accelerometer. The at least two watches further comprise a wireless communication interface for communicating with a server; at least one processor; and at least one memory including computer program code for one or more programs, the at least one memory and the computer program code operating together with the at least one processor to cause the sports watch to perform at least the following: the system comprises at least one server comprising at least one processor and at least one memory including computer program code for one or more programs, the at least one memory and the computer program code operating together with the at least one processor to cause the server to perform at least the following: determining that at least one sports watch and at least one server are executing at least one common application; a first sports watch collecting sport-specific data and sending the first data to the server; a second sports watch collecting sport-specific data and sending the second data to the server; the server comparing the first data and at least the second data; the server detecting a common context with the first data and at least the second data; and the server creating an event based on the common context. The common application determined common between the sports watch and the server may comprise two separate applications that are running on separate processors. Separate applications may be defined as common if data is shared between the applications and the purpose of the applications is similar. According to an embodiment the application running on the sports watch and the application running on the server operate interactively.

In one embodiment the watch comprises a positioning sensor providing positioning information and the common context comprises at least the location and the sport mode. In one embodiment the server sends a notification of an event invitation to the first sports watch and to at least the second sports watch. In one embodiment the sports watch receives a notification of an event invitation and displays an interactive user-interface object with which a user interacts in order to accept the event creation. In one embodiment the server provides user profiles assigned to sports watches, comprising a first user profile being assigned to the first sports watch, a second user profile being assigned to the second sports watch and a third user profile being assigned to the third sports watch; and the server notifies the third user profile about the created event, wherein the third user profile is assigned to follow the first user profile or the second user profile. In one embodiment the first sports watch receives data from at least the second sports watch participating in the created event.

A third aspect discloses a sports watch comprising at least one sensor for providing movement information. Examples of such sensors are a position sensor providing positioning information or a motion sensor, an inertial sensor or an accelerometer. The sports watch further comprises a wireless communication interface for communicating with a server; at least one processor; and at least one memory including computer program code for one or more programs, the at least one memory and the computer program code operating together with the at least one processor to cause the sports watch to perform at least the following: collecting sport-specific data, forming sport-specific data from the movement information and sending the data to the server; receiving a notification of an event invitation and displaying an interactive user-interface object with which a user interacts in order to accept the event creation. In one embodiment the sports watch receives data from at least a second sports watch participating in the created event.

In an embodiment the sports watch alerts the user, if the received data from at least the second sports watch participating in the created event is outside predefined criteria. In an embodiment the first sports watch receives data from at least the second sports watch participating in the created event.

A fourth aspect discloses a non-transitory computer program comprising computer program code embodied on a tangible computer-readable medium, the computer program code configured to carry out the method described hereinbefore.

A fifth aspect discloses a computing device comprising at least one processor and at least one memory including computer program code for one or more programs. The at least one memory and the computer program code operating together with the at least one processor cause the server to perform at least the following: receiving a first sport-specific data from a first sports watch; receiving a second sport-specific data from a second sports watch; comparing the first sport-specific data and at least the second sport-specific data; detecting a common context with the first sport-specific data and at least the sport-specific second data; and creating an event based on the common context.

In an embodiment the computing device is configured to present the event on a web page accessible over a communications network. In an embodiment the computing device is a server. The event is presented for example on a server, on a cloud computing environment or on a smart phone application. In an embodiment portions of the functionality are distributed between the smart phone application and the server.

In an embodiment the computing device allows a user profile assigned as a user of a sports watch to join the event.

The embodiments described hereinbefore may be used in any combination with each other. Several of the embodiments may be combined together to form a further embodiment. A method, an apparatus, a sports watch, a computing device, a system, a computer program or a computer program product to which the invention is related may comprise at least one of the embodiments of the invention described hereinbefore. It is to be understood that any of the above embodiments or modifications can be applied singly or in combination to the respective aspects to which they refer, unless they are explicitly stated as excluding alternatives. The text uses terms "sports watch", "the sports watch", "the second sports watch" in a meaning where the relevant features of the embodiment may be present in all aspects of the mentioned sports watches. Prefixes "first" or "second" refer to objects without a numerical meaning.

The present solution simplifies the creating of the event with a limited user interface. The server recognizes possible events and creates the event or sends the notification to the sports watch enabling the user to accept the creating of the event. In this case the user can just accept the new event that has been created "ad-hoc" by the server. The present invention further improves the adaptability of sports watches.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Reference will now be made in detail to the embodiments of the present invention, examples of which are illustrated in the accompanying drawings. The detailed description provided below in connection with the appended drawings is intended as a description of the present examples and is not intended to represent the only forms in which the present example may be constructed or utilized. However, the same or equivalent functions and sequences may be accomplished by different examples.

Figure 5:
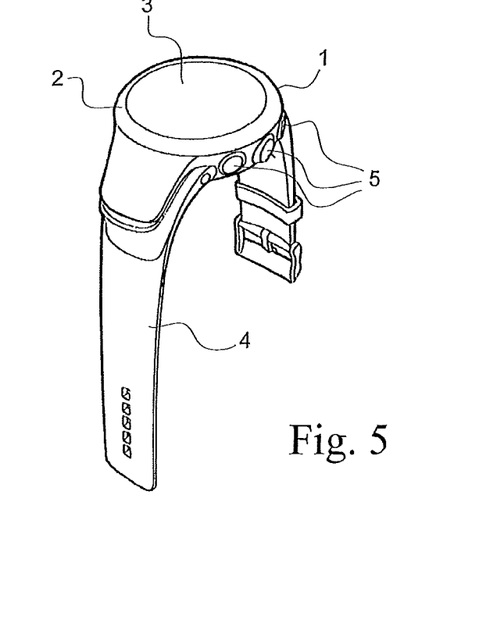
FIG. 5 is a schematic illustration of a sports watch.

FIG. 5 illustrates a schematic picture of a sports watch 1 (also 102, 104 and 106) according to one embodiment. The sports watch 1 comprises a housing 2 carrying a display 3. The housing 2 is attached to a wristband 4. The sports watch 1 comprises means for user interaction, such as buttons 5 in the exemplary device. In alternative preferred embodiments, other forms of inputs can also be used, such as touch screens, dials, remote transmissions, etc. The display 3 is adapted to show information to the user.

The sports watch 1 comprises sensors arranged to the housing 2 (sensor 10) or sensors that are connectable to the housing wirelessly or in some embodiments by wire (sensor 12). The sensor 10 and/or 12 can be one or more of many different types of sensors, such as, for example, a positioning sensor, a compass sensor, a motion sensor, a speed sensor, an acceleration sensor, rotational sensor, wind sensor, a sailing sensor, a wheel speed sensor, cadence sensor, a temperature sensor, other sensors, and/or combinations thereof. A positioning sensor provides positioning information. Examples of the positioning sensor are a compass sensor or sensors configured to acquire a position from satellite positioning systems such as GPS, GLONASS or Galileo; indoor positioning systems acquiring the information from a cell network, Wi-Fi network or from any indoor beacon system. The motion sensor is for example an inertial sensor, an accelerometer, a gyroscope sensor, A MEMS sensor or a sensor for measuring acceleration, tilt, shock, vibration, rotation, and a multiple degrees-of-freedom sensor.

The sports watch 1 comprises a wireless communication interface 14 for connecting to at least one sensor 12 and receiving wireless sensor information. The interface may be NFC, RFID, Bluetooth, Wi-FI or similar close perimeter communication. Examples of sensors 12 connectable to the sports watch 1 are a heart rate sensor, cycle speed sensor, cadence sensor, wind speed sensor or the like. The wireless communication interface 14 may also be configured to connect to an IP network 16 via a mobile data connection for receiving and transmitting data. Examples of a mobile data connection are transmission technologies such as GSM, GPRS, 3G, LTE or any other means of cellular communication. The wireless communication interface 14 may be connectable to the IP network 16 also via a short range connection to the mobile phone 18 and using the mobile phone's data connection entering the IP network 16. The network 16 can be an IP network, a personal network, cloud based network, a facility based network, a closed network, an Internet network and combinations thereof.

The sports watch 1 may be part of a personal network 16, wherein the personal network 16 may comprise devices 18 or sensors 12 connected to the sports watch 1 wirelessly or via a wired connection. The sports watch 1 may utilize the information provided by other devices as the personal network 16 enables the sensor data to be transmitted between devices connected to the personal network. For example a mobile phone 18 or a smart phone may be connected to the sports watch 1, wherein the positioning data acquired by the mobile phone is sent to the sports watch 1. The smart phone 18 may comprise an application configured to interact with the sports watch 1. The information to be transferred between the sports watch 1 and the server 105 may be stored on the smart phone application or modified by the smart phone application.

The data received by the sports watch 1 may be sent to other devices 18; for example, the sports watch 1 may receive heart rate data from a heart rate sensor 12 and send the heart rate data information to be displayed on the mobile phone 18. Examples of sensors 12 connectable to the personal network are: a cadence sensor for measuring a pedaling rate, a power meter or a wheel speed sensor for a cycle; sailing sensors such as a wind speed sensor or a wind direction sensor; any suitable sensor on a motor vehicle such as a positioning sensor. Devices on the personal network 16 may be connected by a Bluetooth, Bluetooth LE, ANT+ or any other wireless connection interface that may support a low power transmission technology.

The sports watch 1 comprises several sport modes configured for certain sports, wherein the sport mode may seek a predefined sensor configuration or display characteristics most suitable for that sport. Sport modes may be preconfigured in the sports watch or the user may configure additional sport modes with a desired sensor configuration, display appearance and/or values to be calculated by the sports watch. One of the display modes may be a traditional watch mode, where the display shows the time and/or date.

Figure 1:
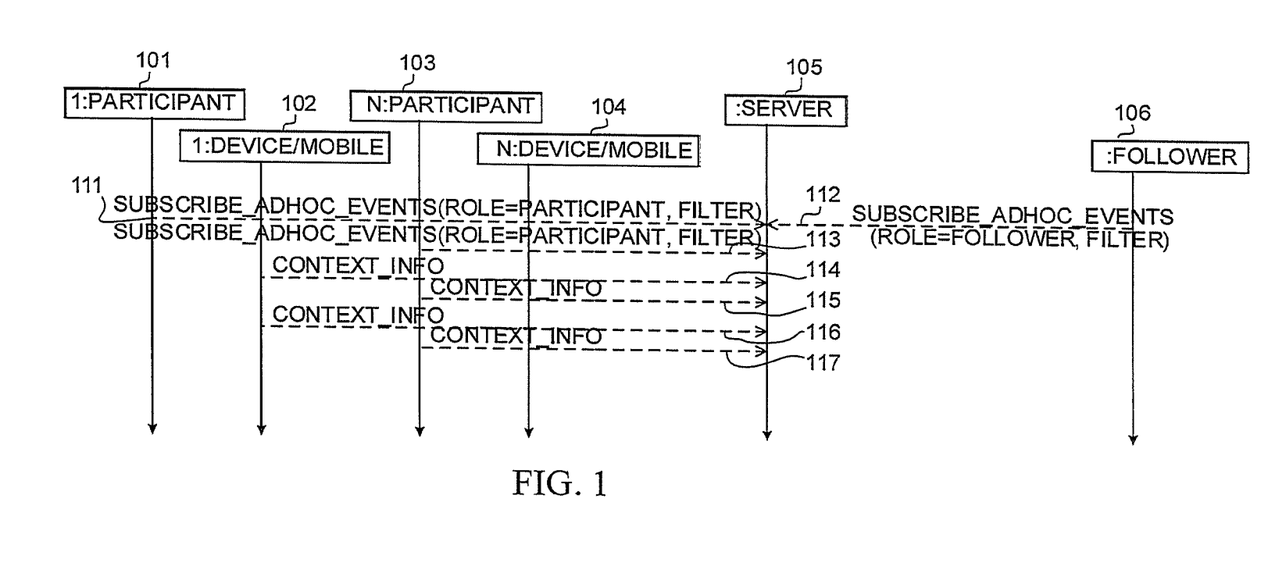
FIGS. 1-4 are flowcharts illustrating functions of embodiments according to the invention

FIG. 1 illustrates a flowchart with functions of one embodiment, the event enrollment. The flowchart has six elements that are used also in the following examples. The first sports watch 102 is used via the user interface by the first user 101. The second sports watch 104 is used via the user interface by the first user 101 or a second user 103. This example does not limit the number of users or sports watches to be applied. Sports watches are connectable via an IP network to a server 105. The server 105 can be any remote computing location. In one example the server 105 comprises a database with all sports performance data uploaded by the users. Users may be categorized according to age, gender or by any other freely assignable category, for example by friendship. Users may follow each other and compare results via the server and/or the database. A follower 106 is following the group of the first user 101 and the second user 103. In one implementation, the first user 101 may also have the role of the follower 106. In another implementation, the second user 103 may have the role of the follower 106. In one implementation, the follower 106 can be a third sports watch that is substantially similar to the first or the second sports watch 102 and 104. In another implementation, the follower 106 can be a remote electronic device or a remote server.

In step 111 the first user selects from the service provided by the server 106 that he/she enables all ad hoc events. Similarly, the follower 106 can follow all ad hoc events and their creation, step 112. In step 113, also the second user subscribes or enables the ad hoc events. Filter dimensions may be applied to the creation of ad hoc events, selectable by the user: for example times, locations, users, groups, sport types or event categories.

The first sports watch 102 sends the context info to the server 105, comprising in this example a location and a sport mode such as running or walking, step 114. The second sports watch 104 sends similar information to the server 105. Similar context information may be sent to the server 105 later, steps 116 and 117. The server stores the performance data in the database.

Figure 2:
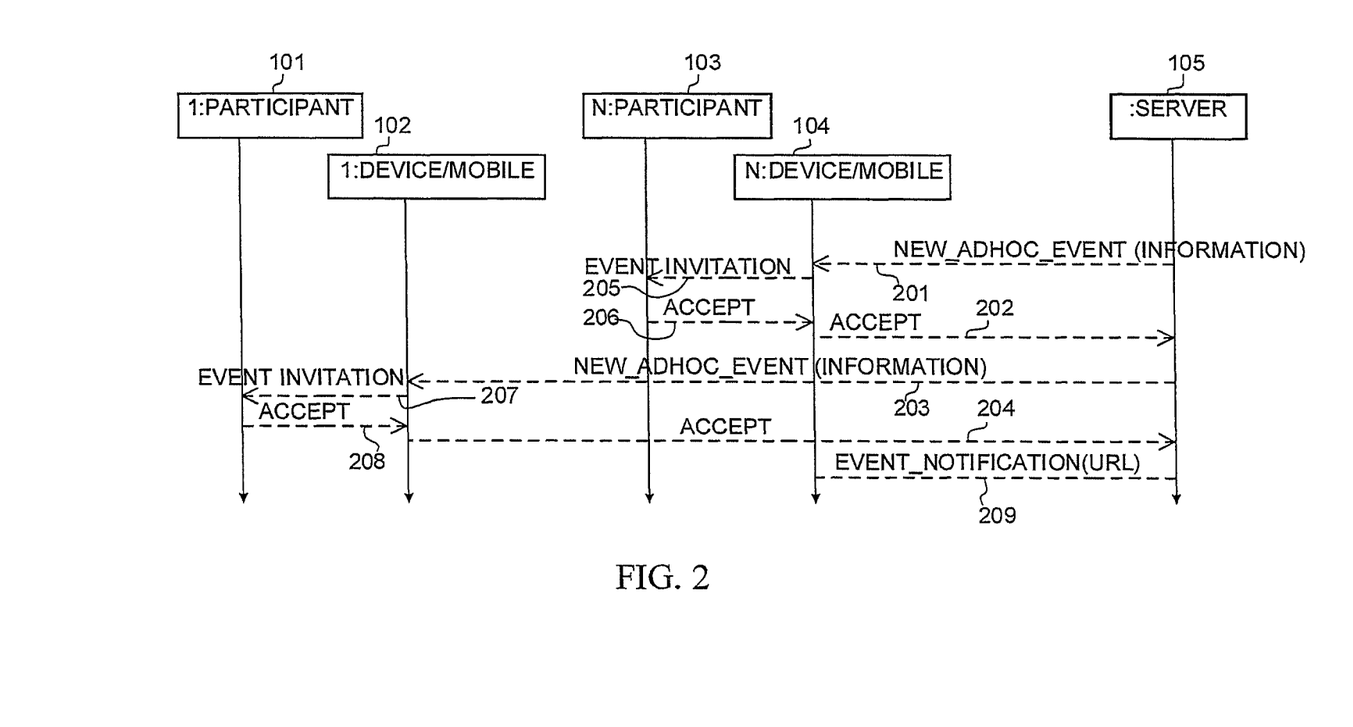

FIG. 2 illustrates a flowchart illustrating the event creation process. If the server 105 detects that the stored data in the database has a common context, a new tentative event will be created, and the information will be sent to the first sports watch 102, step 203 and to the second sports watch 104, step 201. The first user 101 is prompted by the first sports watch 102 of whether the event invitation is accepted, steps 207, 208; a similar procedure takes place with the second user 103 in steps 205, 206. If both users accept the event to be created in steps 202 and 2044, the event is created from the tentative event. The event notification 209 is sent to the follower 106.

Figure 3:
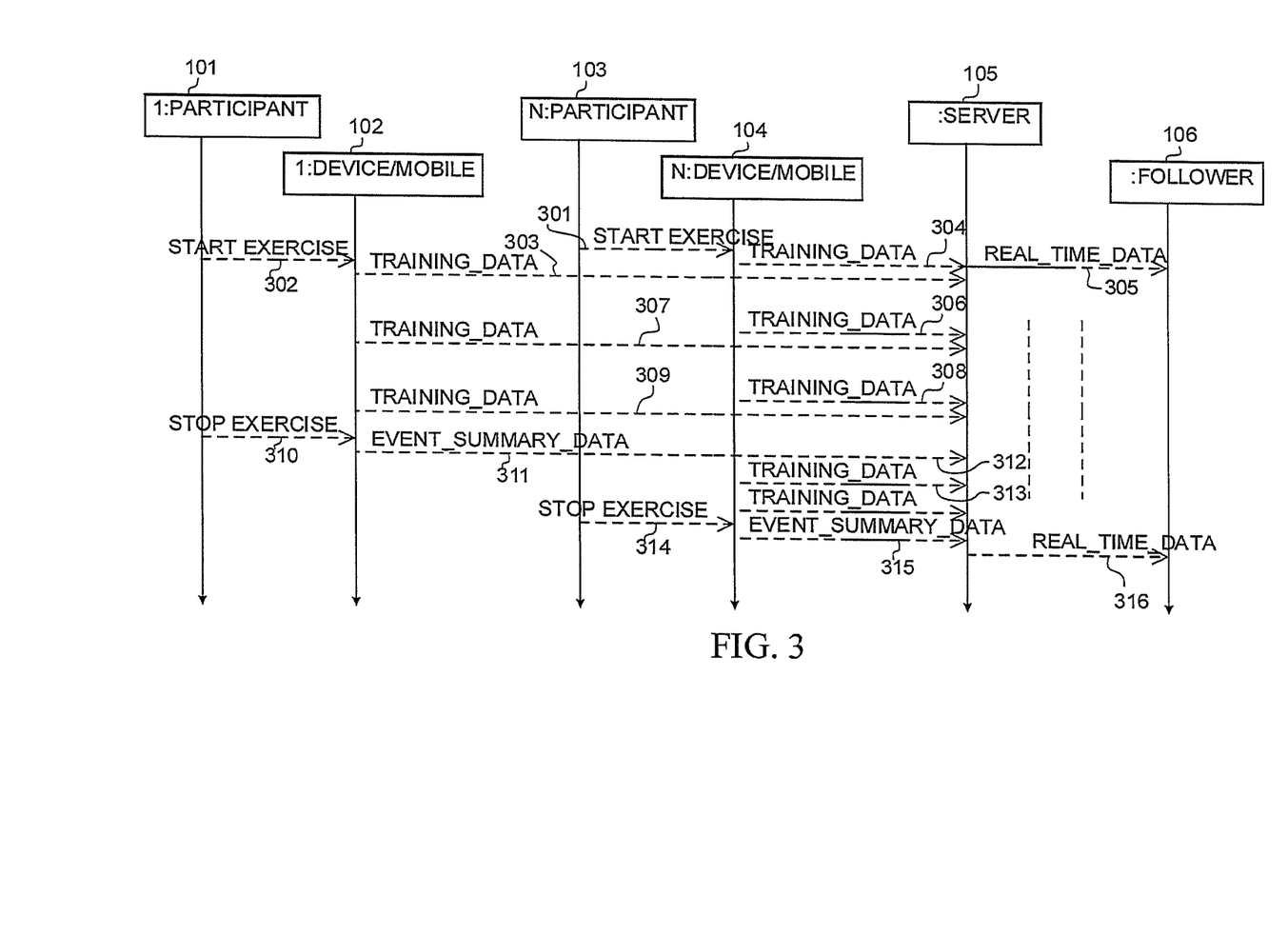

One benefit of the present solution is enabling the effective sharing of data. FIG. 3 discloses an example of real time sharing, where the first user 101 and the second user 103 exercise simultaneously, starting the exercise in steps 301, 302. Training data is sent to the server 105 in step 303, where the second user 103 is the first to start exercising. The follower 106 receives immediately real time data from the second user 103. More data is sent to the server 105 in steps 306-309, 312-313; wherein all data also received by the server is sent forward to the follower 106. As stated, both the first user 101 and the second user 103 may have the roles of followers 106. In one example the follower 106 monitors the performance via the desktop computer or the like, not participating in the event. As the exercise is stopped, the sports watches 102, 104 send event summary data 311, 315 to the server 106. The follower 106 receives real time data of the completed event and also possible event summary data.

Figure 4:
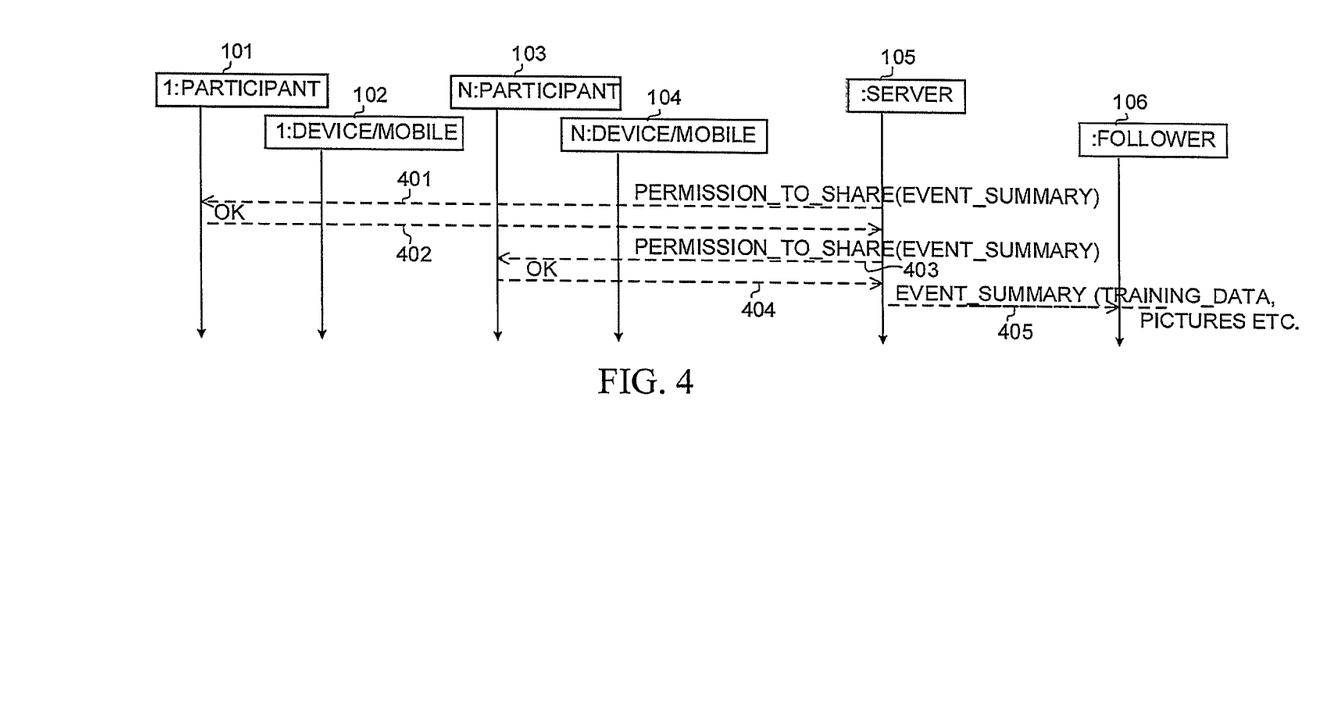

FIG. 4 discloses an example, wherein the information is shared after the event. In this example the server 105 sends a request to the first user 101 for a permission to share the event and/or the event summary, step 401. A similar permission request is sent to the second user 103, step 403. The permission request does not need to be sent to the sports watches 102, 104 as the permission may be granted by any terminal available and indicated by the user. As both users accepted the sharing, a response is sent to the server 105 in steps 402, 404. As a result, event summary data may be sent to the followers in step 405. Event summary data may comprise training data and/or related pictures taken during the exercise. The pictures may contain position information and a time label that matches the event; thereby, pictures may be easily attached to the exercise data by the server 105.

Figure 6:
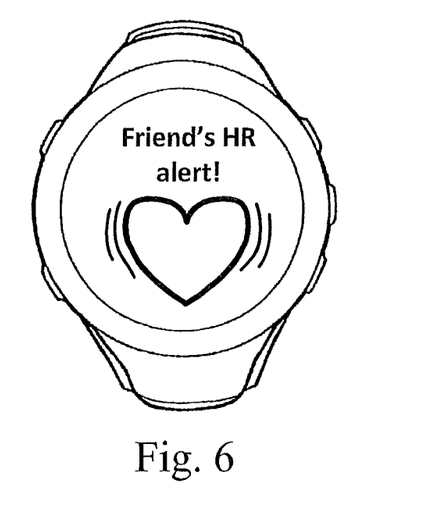
FIG. 6 is an illustration of an exemplary use case.

The ad hoc event creation may be used to share data easily between groups. For example, FIG. 6 illustrates one use case example of an alarm, wherein the common context information comprises the heart rate of all participants. If the group is exercising together, heart rates may be monitored and it is easier to maintain the group together—preventing the weakest member of the group from getting tired too early in the exercise. Others may slow their pace when they see this alarm. The information between the sports watches may be transmitted via the wireless data interface configured in the sports watch or via the personal network that enables the sports watch to utilize the mobile data connection of a smart phone.

Figure 7:
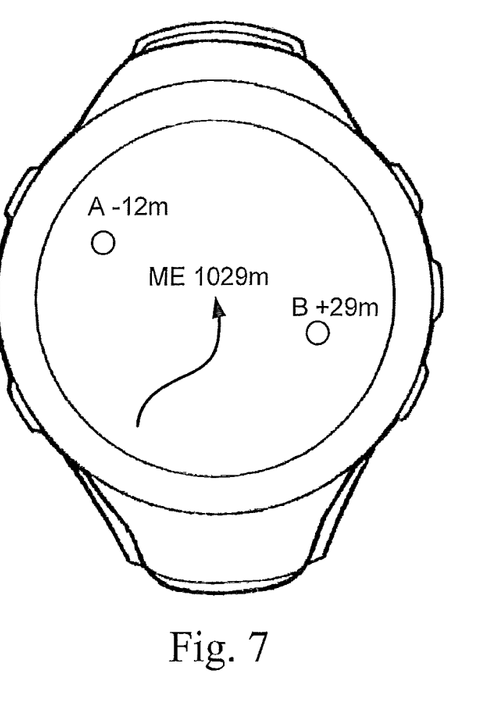
FIG. 7 is an illustration of a second exemplary use case.

FIG. 7 illustrates a second exemplary use case, where distances between users, for example the sports watch 1 user ME and other users A and B are shown on the sports watch. If the group is moving for example in the forest, they cannot see each other. With this function it is assured that the group will stay at a predefined distance from each other. The system may also be used to send a get together call for all participants.

Figure 8:
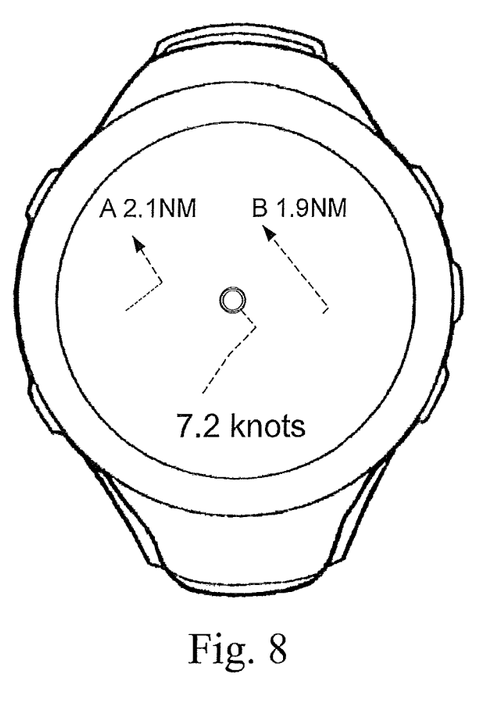
FIG. 8 is an illustration of a third exemplary use case.
Figure 9:
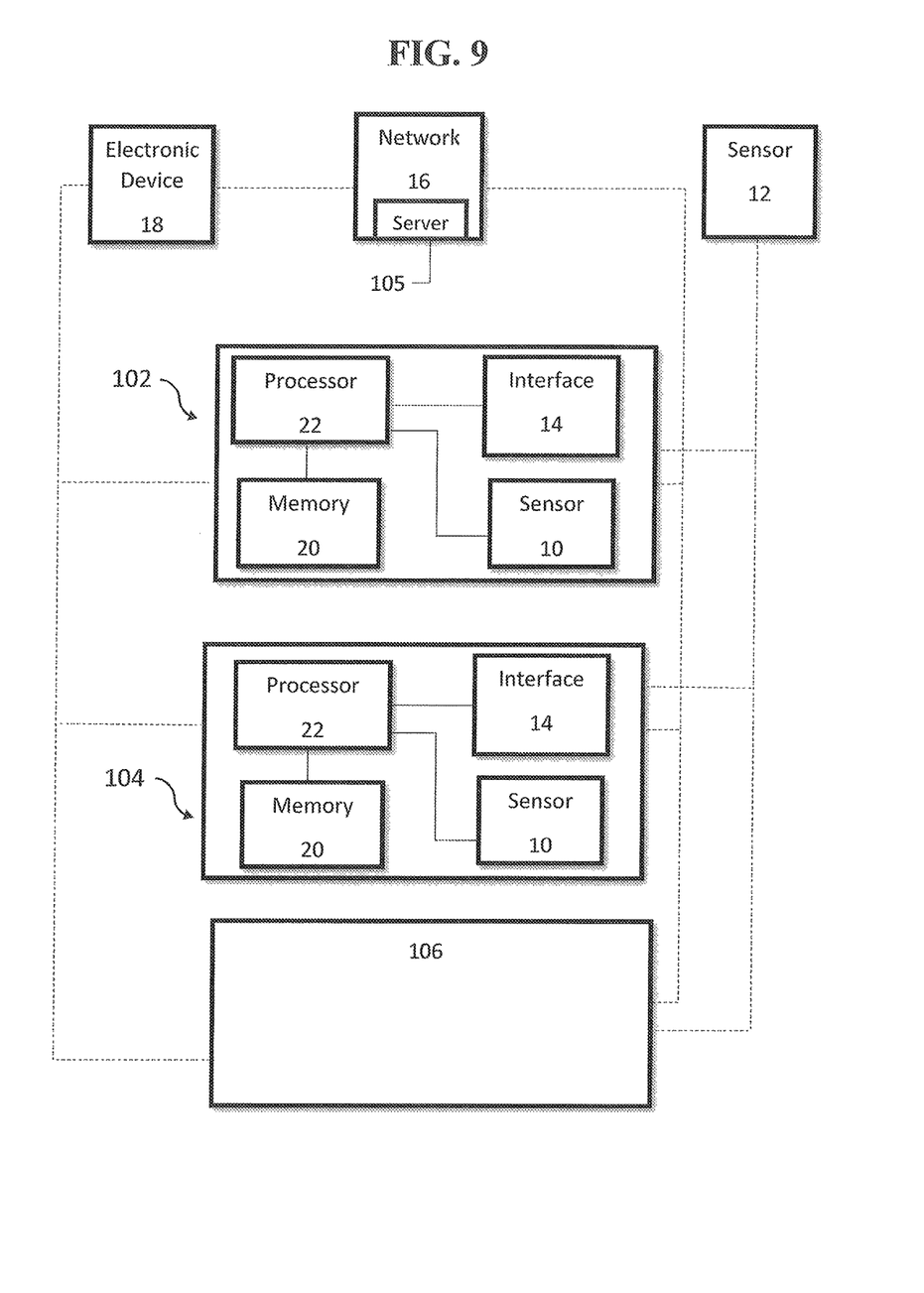
FIG. 9 is a schematic illustration of an example sports watch system.

FIG. 8 illustrates a sailing example, wherein directions, speeds or any other sailing data can be compared on the screen of the sports watch 1. Sailors having similar or comparable boats and compatible sports watches may compare each other in similar conditions, for example who can achieve the highest speed or the best angle against the wind. The data from other boats may be collected by the personal network wherein for example the sports watch or the smart phone application gathers data from various sensors. The server may collect the data and select the information to be shown on a sports watch according to predefined rules, for example by detecting different parameters from other close sailing boats. Examples of such parameters are different wind speed, wind direction or boat speed. One example of the information on the display is the center arrow representing the sports watch user and other users A and B, wherein the arrows present the speed and direction and numerical information of the distance to the user of the sports watch. The longer arrow represents a faster speed with recent route information.

In an embodiment the start time, end time, stating position or the finishing position of the special event is marked in the data stored in the circular buffer memory. The data may be transported from the circular buffer memory to the database or to the non-volatile memory of the sports watch, wherein the marked data is stored with the circular buffer data. The data stored may be starting from a predetermined period before detecting the special event and/or after detecting the special event. According to various embodiments, the performance data, event data, move data or any chosen period data may be stored in the sports watch and transferred to a computer or a smart phone. The transferred data may be modified with the marked data. For example the start time and position of a running performance may be identified when a change in the speed is detected. Changes in speed may indicate that the runner has stopped walking or has arrived at the location by car. As another example, a hiking event may be marked if the speed of the hiker is detected to be above reasonable limits, such as when the hiker has continued in a car and the speed exceeds 20 km/h. The position information may be detected near a highway generally not allowed for walking, wherein the user of the sports watch may be on a motored vehicle. In an embodiment the sports watch may detect sensor data having a context with automobiles, such as the car position sensor, and mark the detection of the new sensor data. Other examples of detectable car related sensor data that may be used are the engine revolutions per min, oil pressure, gear, speed, accelerometer or temperature sensor. The event to be detected may be related to motorsports. The detected event data is saved on the sports watch 1. The performance may be easily limited to the actual performance afterwards as the performance is later viewed on a computer or smart phone. The marked position highlights at least one position or time where the surrounding parameters have changed. This may alleviate the problem where the user has not remembered to start or stop the recording of the sports data at a correct time. The problem could result in distorted performance data; for example, the average speed may calculate actions such as the user driving a car when the recorded event is purposed for running.

In an embodiment of the invention the invention is implemented as computer software that is configured to execute the method and independent features described above when the computer software is executed on a computing device 18. The computer software may be embodied on a computer readable medium or distributed in a network such as the Internet. In one example the computer software is executed in the sports watch or in the server from a cloud computing environment. The server 105 may be hosting a portal or the system may comprise several servers configured to host a portal. The portal and/or the server 105 may have connection to Internet related facilities either directly, or via other network element. The portal, the computing device 18 or the server 105 may interact with the sports watch 1. The functions of the computer software may be distributed to different instances, for example between the sports watch 1, the smartphone application connectable to the sports watch 1 or to the server 105 or any computing device 18 in a cloud computing environment. Although the above components may be variously referred to as servers, each may be also referred to as a processing device, unit, component or system and may incorporate therein a local data store or database, or interface with an external database. Use of the word server herein does not require the component to interact in a client-server arrangement using web-based protocols with other components, although that may be the case. Further, the above components may be located remotely from other components. Furthermore, one or more of the components may be implemented on a single processing device to perform the functions described herein.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or a processor 22. A computer-readable medium may comprise a computer-readable storage medium that may be any media or means that can contain or store the instructions for use by or in connection with an instruction execution system, apparatus, or device, such as a computer or processor 22. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors 22, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method executed on a computing device for creating an event accessible over a communications network, the method comprising:

receiving, by the computing device, a first sport-specific data from a first sports watch, wherein the first sports watch comprises a first housing, a first wristband attached to the first housing, a first sensor positioned in the first housing and a second sensor wirelessly connected to the first sports watch, wherein the first sport-specific data comprises a sport mode and sensor data, wherein the sport mode is configured for a certain sport that a first user wearing the first sports watch on a wrist is practicing, and wherein the sensor data relates to the sport mode and comprises configured sensor configuration for the certain sport;

receiving, by the computing device, a second sport-specific data from a second sports watch, wherein the second sports watch comprises a second housing, a second wristband attached to the second housing, a third sensor positioned in the second housing and a fourth sensor wirelessly connected to the second sports watch, wherein the second sport-specific data comprises the sport mode and the sensor data, wherein the sport mode is configured for a certain sport that a second user wearing the first sports watch on a wrist is practicing, and wherein the sensor data relates to the sport mode and comprises configured sensor configuration for the certain sport;

comparing, by the computing device, the first sport-specific data and the second sport-specific data;
detecting, by the computing device, a common context with the first sport-specific data and the sport-specific second data; and
creating, by the computing device, an event, based on the common context, ad hoc enabling the first or the second sport watch to only accept the event in order to join the event.

2. The method of claim 1, wherein the first sport-specific data is formed by the first sports watch and the second sport-specific data is formed by the second sports watch.

3. The method of claim 1, further comprising the step of allowing a user profile assigned to a user of a sports watch to join the event.

4. The method of claim 1, wherein the first sport-specific data and the second sport-specific data include positioning information and the common context includes at least the location of the event and the sport that the event relates to.

5. The method of claim 1, further comprising the step of the computing device sending a notification of an event invitation to the first sports watch and to the second sports watch.

6. The method of claim 1, further comprising the steps of:
receiving third sport-specific data from a third sports watch, and
comparing the first, second and third sport-specific data, wherein the common context is detected with the first, second and third sport-specific data.

7. The method of claim 6, wherein the computing device provides a first user profile assigned to the first sports watch, wherein the computing device provides a second user profile assigned to the second sports watch, and wherein the computing device provides a third user profile assigned to the third sports watch, wherein the computing device notifies a third user profile about the created event, and wherein the third user profile is assigned to follow the first user profile or the second user profile.

8. The method of claim 1, wherein the computing device is a server, and wherein the server provides a web page accessible via the Internet.

9. The method of claim 1, wherein the first sports watch is connected to a mobile phone, and the mobile phone comprises the second sensor.

10. The method of claim 1, wherein the common context is configured without considering locations of the first and the second sport watches.

11. A first sports watch for use by a first user and configured to communicate with a server, the first sports watch comprising:
a housing;
a wristband attached to the housing;
a first sensor positioned in the housing;
a wireless communication interface for communicating with the server, wherein the wireless communication interface is further configured to connect to a second sensor wirelessly;
wherein one of the first and second sensors is configured to provide movement information;
at least one processor;
at least one memory;
a display; and
a non-transient computer-readable medium containing code to direct the processor to:
collect the movement information;
form sport-specific data from the movement information, wherein the first sport-specific data comprises a sport mode and sensor data, wherein the sport mode is configured for a certain sport that the first user wearing the first sports watch on his or her wrist is practicing, and wherein the sensor data relates to the sport mode and comprises configured sensor configuration for the certain sport;
send the sport-specific data to the server;
receive a notification of an event creation from the server;
display on the display an interactive user-interface object with which a user interacts in order to accept the event creation; and
accept the event so that the sport watch is configured to join the event ad hoc by only accepting the event invitation.

12. The first sports watch of claim 11, wherein the non-transient computer-readable medium containing code further directs the processor to receive data from at least a second sports watch participating in the created event.

13. The first sports watch of claim 12, wherein the non-transient computer-readable medium containing code further directs the processor to alert the user, if the received data from at least the second sports watch participating in the created event is outside a predefined criteria.

14. The first sports watch of claim 12, wherein the first sports watch is configured to receive data from at least the second sports watch participating in the created event.

15. A system for use by a first user and a second user, the system comprising:
at least first and second sports watches; and
at least one server including at least one server processor, wherein the first sports watch includes:
a first housing,
a first wristband attached to the first housing,
a first sensor positioned in the first housing,
a wireless communication interface, wherein the wireless communication interface is further configured to connect to a second sensor wirelessly,
wherein one of the first and second sensors is configured to provide movement information,
at least one first sports watch processor,
at least one first memory, and
a first non-transient computer-readable medium containing code to direct the first sports watch processor to:
collect first movement information from the first sports watch,
form first sport-specific data from the first movement information, form first sport-specific data from the first movement information, wherein the first sport-specific data comprises a sport mode and sensor data, wherein the sport mode is configured for a certain sport that the first user wearing the first sports watch on his or her wrist is practicing, and wherein the sensor data relates to the sport mode and comprises configured sensor configuration for the certain sport, and
send the first sport-specific data to the at least one server;
wherein the second sports watch includes:
a second housing,
a second wristband attached to the second housing,
a third sensor positioned in the second housing,
a wireless communication interface, wherein the wireless communication interface is further configured to connect to a fourth sensor wirelessly, wherein one of the third and fourth sensors is configured to provide movement information, at least one second sports watch processor, at least one second memory; and a second non-transient computer-readable medium containing code to direct the second sports watch processor to:

collect second movement information from the second sports watch,     form second sport-specific data from the second movement information, wherein the second sport-specific data comprises the sport mode and the sensor data, wherein the sport mode is configured for a certain sport that the second user wearing the first sports watch on a wrist is practicing, and wherein the sensor data relates to the sport mode and comprises configured sensor configuration for the certain sport, and     send the second sport-specific data to the at least one server;

wherein the server further includes a third non-transient computer-readable medium containing code to direct the at least one server processor to:

determine that the at least first and second sports watches and the at least one server are executing at least one common application;

compare the first sport-specific data and at least the second sport-specific data;

detect a common context with the first sport-specific data and at least the sport-specific second data; and create an event, based on the common context, ad hoc enabling the first or the second sport watch to only accept the event in order to join the event.

16. The system of claim 15, wherein at least one of the first and second sports watches comprises a positioning sensor providing positioning information, and wherein the common context comprises at least the location and the sport mode.

17. The system of claim 15, wherein the third non-transient computer-readable medium containing code further directs the at least one server processor to send a notification of the event creation to the first and second sports watches.

18. The system of claim 17, wherein the first and second non-transient computer-readable mediums containing code to further direct the first and second sports watch processors, respectively, to receive a notification of the event creation and to display an interactive user-interface object with which users of the first and second sports watches can interact with in order to accept the event creation.

19. The system of claim 15, further comprising a third sports watch including:

at least one third sensor providing third movement information, a third wireless communication interface, at least one third sports watch processor, at least one third memory, and a fourth non-transient computer-readable medium containing code to direct the third sports watch processor to:

collect third movement information from the third sports watch,     form third sport-specific data from the third movement information, and     send the third sport-specific data to the at least one server.

20. The system of claim 19, wherein the third non-transient computer-readable medium containing code further directs the at least one server processor to compare the first, second and third sport-specific data, and wherein the common context is detected with the first, second and third sport-specific data.

21. The system of claim 20, wherein the server provides a plurality of user profiles assigned to sports watches including a first user profile being assigned to the first sports watch, a second user profile being assigned to the second sports watch and a third user profile being assigned to the third sports watch.

22. The system of claim 21, wherein the server notifies the third user profile about the created event, and wherein the third user profile is assigned to follow the first user profile or the second user profile.

23. The system of claim 15, wherein the first sports watch receives data from at least the second sports watch participating in the created event.

24. The system of claim 23, wherein the first sports watch alerts the user, if the received data from at least the second sports watch participating in the created event is outside predefined criteria.

\* \* \* \* \*